United States Patent
Nayebi et al.

(10) Patent No.: US 10,724,499 B2
(45) Date of Patent: Jul. 28, 2020

(54) CONTROLLING WIND TURBINES ACCORDING TO RELIABILITY ESTIMATES

(71) Applicant: VESTAS WIND SYSTEMS A/S, Aarhus N (DK)

(72) Inventors: Kouroush Nayebi, Ikast (DK); Jacob Deleuran Grunnet, Tranbjerg J (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 35 days.

(21) Appl. No.: 16/060,104

(22) PCT Filed: Dec. 1, 2016

(86) PCT No.: PCT/DK2016/050405
§ 371 (c)(1),
(2) Date: Jun. 7, 2018

(87) PCT Pub. No.: WO2017/108044
PCT Pub. Date: Jun. 29, 2017

(65) Prior Publication Data
US 2018/0363627 A1    Dec. 20, 2018

(30) Foreign Application Priority Data

Dec. 23, 2015 (DK) .................. 2015 70872

(51) Int. Cl.
*G05B 13/02* (2006.01)
*F03D 7/04* (2006.01)
(Continued)

(52) U.S. Cl.
CPC ............. *F03D 7/045* (2013.01); *F03D 7/028* (2013.01); *F03D 7/048* (2013.01); *F03D 17/00* (2016.05);
(Continued)

(58) Field of Classification Search
CPC ....... Y02E 10/723; F03D 17/00; F03D 7/048; F03D 7/0292; F03D 80/50; F03D 7/045;
(Continued)

(56) References Cited

U.S. PATENT DOCUMENTS

| 6,671,585 | B2 * | 12/2003 | Lof ................. F03D 7/0284 |
| | | | 705/36 R |
| 6,782,303 | B1 * | 8/2004 | Fong ................. G05B 19/4099 |
| | | | 700/119 |

(Continued)

FOREIGN PATENT DOCUMENTS

| CN | 101846037 A | 9/2010 |
| DE | 102010054631 A1 | 6/2012 |

(Continued)

OTHER PUBLICATIONS

PCT Notification of Transmittal of The International Search Report and The Written Opinion of the International Searching Authority, or the Declaration for Application No. PCT/DK20106/050405 dated Feb. 14, 2017.

(Continued)

*Primary Examiner* — Darrin D Dunn
(74) *Attorney, Agent, or Firm* — Patterson + Sheridan, LLP

(57) ABSTRACT

There is presented a method for controlling a plurality of wind turbines comprising measuring wind turbine operation parameters in a model relating a plurality of wind turbine parameters to each other, estimating one wind turbine operation parameter value based on the model and the measured remaining wind turbine operation parameter values, providing a reliability parameter value for each wind turbine based on a difference value, said difference value being a difference between the estimated wind turbine operation parameter value, and the measured wind turbine operation parameter value corresponding to the wind turbine operation (Continued)

US 10,724,499 B2

Page 2 parameter for which the estimated wind turbine operation parameter value is provided, and controlling the plurality of wind turbines based on the corresponding plurality of reliability parameter values.

15 Claims, 3 Drawing Sheets

(51) Int. Cl.
  F03D 17/00 (2016.01)
  F03D 7/02 (2006.01)
  G05B 13/04 (2006.01)
(52) U.S. Cl.
  CPC ...... *G05B 13/042* (2013.01); *F05B 2220/706* (2013.01); *F05B 2260/84* (2013.01); *F05B 2270/1033* (2013.01); *F05B 2270/32* (2013.01); *F05B 2270/327* (2013.01); *F05B 2270/328* (2013.01); *F05B 2270/335* (2013.01); *Y02E 10/723* (2013.01)
(58) Field of Classification Search
  CPC ...... F03D 7/04; F03D 7/046; F05B 2270/332; F05B 2260/84; F05B 2260/821; F05B 2260/80; F05B 2270/20; F05B 2270/1033; F05B 2270/1095; F05B 2270/109; G05B 23/0283; G05B 13/026; G05B 13/021; G05B 13/041; G05B 13/048; G05B 23/0232; G05B 23/024; G05B 23/0254; G05B 23/0272; G05B 23/0286
  See application file for complete search history.

(56) References Cited

U.S. PATENT DOCUMENTS

| | | | | |
|---|---|---|---|---|
| 7,509,190 | B2* | 3/2009 | Emery | G06Q 50/06 700/291 |
| 8,249,852 | B2* | 8/2012 | Thulke | F03D 7/045 703/18 |
| 8,457,911 | B2* | 6/2013 | Parikh | H02J 3/00 290/44 |
| 8,476,780 | B2* | 7/2013 | Hashimoto | F03D 7/0204 290/43 |
| 9,062,653 | B2* | 6/2015 | Brath | F03D 7/0264 |
| 9,189,755 | B2* | 11/2015 | Krishna | F03D 17/00 |
| 9,337,656 | B2* | 5/2016 | Westergaard | H02J 3/00 |
| 9,606,518 | B2* | 3/2017 | Evans | G05B 13/026 |
| 9,644,612 | B2* | 5/2017 | Evans | F03D 17/00 |
| 9,797,377 | B2* | 10/2017 | Bhaskar | F03D 7/028 |
| 9,816,483 | B2* | 11/2017 | Nakamura | F03D 7/00 |
| 9,822,764 | B2* | 11/2017 | Esbensen | F03D 7/04 |
| 9,822,765 | B2* | 11/2017 | Babazadeh | F03D 7/048 |
| 9,835,136 | B2* | 12/2017 | Haj-Maharsi | F03D 9/10 |
| 9,846,976 | B2* | 12/2017 | Van Duijvendijk | G07C 3/00 |
| 9,856,855 | B2* | 1/2018 | Kjær | F03D 7/0264 |
| 10,119,521 | B2* | 11/2018 | Thomsen | G01M 5/0041 |
| 10,197,042 | B2* | 2/2019 | Garcia | F03D 1/0666 |
| 10,273,938 | B2* | 4/2019 | Kjær | F03D 7/028 |
| 10,294,922 | B2* | 5/2019 | Spruce | G05B 19/042 |
| 10,443,567 | B2* | 10/2019 | Atzler | F03D 7/0224 |
| 2002/0103745 | A1* | 8/2002 | Lof | G06Q 40/04 705/37 |
| 2003/0006613 | A1* | 1/2003 | Lof | F03D 7/0284 290/44 |
| 2005/0127680 | A1* | 6/2005 | Lof | F03D 7/0284 290/44 |
| 2006/0070435 | A1* | 4/2006 | LeMieux | F03D 15/10 73/168 |
| 2007/0124025 | A1* | 5/2007 | Schram | F03D 7/0224 700/287 |
| 2008/0086281 | A1* | 4/2008 | Santos | F03D 7/0292 702/127 |
| 2008/0249665 | A1* | 10/2008 | Emery | G06Q 50/06 700/291 |
| 2009/0299780 | A1* | 12/2009 | Sarkar | F03D 7/048 705/7.11 |
| 2009/0314391 | A1* | 12/2009 | Crump | B22F 3/1055 148/523 |
| 2010/0100249 | A1* | 4/2010 | Molgaard | G06F 9/44505 700/289 |
| 2010/0127495 | A1* | 5/2010 | Egedal | G05B 13/027 290/44 |
| 2010/0138267 | A1* | 6/2010 | Vittal | G05B 23/0283 702/184 |
| 2010/0327599 | A1* | 12/2010 | Nielsen | F03D 9/255 290/55 |
| 2011/0020122 | A1* | 1/2011 | Parthasarathy | F03D 17/00 416/61 |
| 2011/0081226 | A1* | 4/2011 | Wobben | F03D 7/0264 415/1 |
| 2011/0125419 | A1* | 5/2011 | Bechhoefer | F03D 7/047 702/34 |
| 2011/0140428 | A1* | 6/2011 | Wakata | F03D 7/0284 290/44 |
| 2011/0224926 | A1* | 9/2011 | Morjaria | F03D 7/028 702/60 |
| 2011/0241343 | A1* | 10/2011 | Petter | F03D 7/0256 290/44 |
| 2011/0270450 | A1* | 11/2011 | Gujjar | G06Q 10/00 700/287 |
| 2011/0313726 | A1* | 12/2011 | Parthasarathy | G05B 23/024 702/179 |
| 2012/0029892 | A1* | 2/2012 | Thulke | F03D 7/045 703/7 |
| 2012/0053984 | A1* | 3/2012 | Mannar | G06Q 10/0635 705/7.28 |
| 2012/0065792 | A1* | 3/2012 | Yonezawa | H02J 3/14 700/291 |
| 2012/0078518 | A1* | 3/2012 | Krishna | G06Q 50/06 702/3 |
| 2012/0101644 | A1* | 4/2012 | Evans | G05B 13/026 700/287 |
| 2012/0136499 | A1* | 5/2012 | Jang | G06Q 10/00 700/297 |
| 2012/0143537 | A1* | 6/2012 | Nielsen | F03D 7/048 702/60 |
| 2012/0165985 | A1* | 6/2012 | Xia | F03D 80/50 700/259 |
| 2012/0185180 | A1* | 7/2012 | Frederiksen | F03D 17/00 702/35 |
| 2012/0209539 | A1* | 8/2012 | Kim | G05B 23/0221 702/41 |
| 2012/0271593 | A1* | 10/2012 | Uluyol | F03D 7/048 702/179 |
| 2013/0035798 | A1* | 2/2013 | Zhou | F03D 7/0292 700/287 |
| 2013/0038060 | A1* | 2/2013 | Odgaard | F03D 7/0292 290/44 |
| 2013/0060472 | A1* | 3/2013 | Parikh | G01W 1/10 702/3 |
| 2013/0073223 | A1* | 3/2013 | Lapira | G06F 19/00 702/34 |
| 2013/0103202 | A1* | 4/2013 | Bowyer | F03D 7/0292 700/275 |
| 2013/0103213 | A1* | 4/2013 | Ma | F03D 7/047 700/287 |
| 2013/0140819 | A1* | 6/2013 | Abdallah | F03D 7/0224 290/44 |
| 2013/0168963 | A1* | 7/2013 | Garcia | H02J 3/18 290/44 |
| 2013/0214534 | A1* | 8/2013 | Nakamura | F03D 7/00 290/44 |
| 2013/0214535 | A1* | 8/2013 | Brath | F03D 7/0264 290/44 |
| 2014/0006331 | A1* | 1/2014 | Bai | G06N 5/02 706/46 |

(56) References Cited

U.S. PATENT DOCUMENTS

| | | | |
|---|---|---|---|
| 2014/0049046 A1* | 2/2014 | Bengtson | G05B 9/03 290/44 |
| 2014/0086723 A1* | 3/2014 | Bengtson | F03D 7/047 415/1 |
| 2014/0116124 A1* | 5/2014 | Ma | G05B 23/0232 73/112.01 |
| 2014/0152013 A1* | 6/2014 | Spruce | F03D 7/0204 290/44 |
| 2014/0163904 A1* | 6/2014 | Bechhoefer | F03D 7/047 702/34 |
| 2014/0178197 A1* | 6/2014 | Risager | F03D 7/0224 416/1 |
| 2014/0188689 A1* | 7/2014 | Kalsi | H02J 3/00 705/37 |
| 2014/0207296 A1* | 7/2014 | Kær | F03D 7/0264 700/287 |
| 2014/0248123 A1* | 9/2014 | Turner | F03D 7/0292 415/1 |
| 2014/0271181 A1* | 9/2014 | Perley | F03D 7/042 416/1 |
| 2014/0328678 A1* | 11/2014 | Guadayol Roig | F03D 7/0292 416/1 |
| 2015/0003983 A1* | 1/2015 | Coultate | F03D 7/043 416/1 |
| 2015/0097373 A1* | 4/2015 | Esbensen | F03D 7/04 290/44 |
| 2015/0134272 A1* | 5/2015 | Fu | F03D 17/00 702/35 |
| 2015/0167637 A1* | 6/2015 | Kooijman | F03D 7/02 416/1 |
| 2015/0176569 A1* | 6/2015 | Karikomi | G01M 15/14 702/34 |
| 2015/0219074 A1* | 8/2015 | Babazadeh | F03D 7/048 290/44 |
| 2015/0267683 A1* | 9/2015 | Ubben | F03D 7/00 290/44 |
| 2015/0292484 A1* | 10/2015 | Haj-Maharsi | F03D 9/10 290/44 |
| 2015/0308413 A1* | 10/2015 | Bhaskar | F03D 7/028 290/44 |
| 2015/0330365 A1* | 11/2015 | Deb | F03D 9/11 700/287 |
| 2016/0010628 A1* | 1/2016 | Dhar | F03D 17/00 702/34 |
| 2016/0034856 A1* | 2/2016 | Son | G06Q 10/20 705/7.18 |
| 2016/0047849 A1* | 2/2016 | Perndl | G01R 19/10 324/123 R |
| 2016/0084233 A1* | 3/2016 | Evans | F03D 17/00 73/112.01 |
| 2016/0160842 A1* | 6/2016 | Pern Ndez De Velasco Munoz | F03D 7/0292 703/7 |
| 2016/0221453 A1* | 8/2016 | Bridges | B60L 53/305 |
| 2016/0265513 A1* | 9/2016 | Evans | F03D 13/30 |
| 2017/0002796 A1* | 1/2017 | Spruce | F03D 7/0284 |
| 2017/0022974 A1* | 1/2017 | Roma | F03D 17/00 |
| 2017/0089325 A1* | 3/2017 | Timbus | F03D 7/0292 |
| 2017/0284368 A1* | 10/2017 | Franke | F03D 7/0292 |
| 2017/0328348 A1* | 11/2017 | Wilson | F03D 17/00 |
| 2017/0370348 A1* | 12/2017 | Wilson | F03D 17/00 |
| 2018/0156197 A1* | 6/2018 | Spruce | F03D 7/028 |
| 2018/0171978 A1* | 6/2018 | Spruce | F03D 7/0288 |
| 2018/0223806 A1* | 8/2018 | Badrinath Krishna | F03D 7/046 |
| 2018/0223807 A1* | 8/2018 | Badrinath Krishna | F03D 7/046 |
| 2018/0248380 A1* | 8/2018 | Khabibrakhmanov | H02J 3/383 |
| 2018/0274520 A1* | 9/2018 | Wang | |
| 2018/0320667 A1* | 11/2018 | Beltoft | F03D 17/00 |
| 2018/0335019 A1* | 11/2018 | Knudsen | G06F 17/5009 |
| 2019/0010926 A1* | 1/2019 | Bode | F03D 7/048 |
| 2019/0195189 A1* | 6/2019 | Echenique Subiabre | F03D 7/00 |
| 2019/0203696 A1* | 7/2019 | Kaucic | F03D 7/028 |

FOREIGN PATENT DOCUMENTS

| | | |
|---|---|---|
| EP | 2199606 A2 | 6/2010 |
| WO | 2017108044 A1 | 6/2017 |

OTHER PUBLICATIONS

Z. Hameed et al: "Condition monitoring and fault detection of wind turbines and related algorithms: A review", Renewable and Sustainable Energy Reviews, vo 1 • 13 , No. I, Jan. 1, 2009 (Jan. 1, 2009), pp. 1-39, KP055029113, ISSN: 1364-0321, DOI: 10.1016/j.rser.2007.05.008 Sections 2.3.2.2, pp. 16-17 and 3.2, pp. 22-23; figures 24, 25, 34.

Danish Patent and Trademark Office Technical Examination for Application No. PA 2015 70872 dated Jul. 20, 2016.

Chinese Office Action for Application No. 201680075129.6 dated Apr. 12, 2019.

* cited by examiner

CONTROLLING WIND TURBINES ACCORDING TO RELIABILITY ESTIMATES

FIELD OF THE INVENTION

The invention relates to a method for controlling a plurality of wind turbines, and more particularly to a method for controlling a plurality of wind turbines based on reliability parameter values and a corresponding plurality of wind turbines, computer program product and control system for controlling a plurality of wind turbines.

BACKGROUND OF THE INVENTION

When determining power set-points for wind turbines comprised in a plurality of wind turbines, the controller for the plurality of wind turbines, e.g., the power plant controller (PPC) may use an estimate of what power the individual turbines can produce if the production is not restricted by the power plant controller (Available Power).

In a situation where one or more turbines produces bad estimates of the available power the PPC will not be able to ensure that the wind power plant produces the requested output power.

A wind power plant is also known as a wind farm or a wind park.

Hence, an improved method for controlling a plurality of wind turbines would be advantageous, and in particular a method which overcomes the problems related to bad estimates would be advantageous.

SUMMARY OF THE INVENTION

It may be seen as an object of the present invention to provide an improved method for controlling a plurality of wind turbines, and in particular a method which overcomes the problems related to bad estimates.

Thus, the above described object and several other objects are intended to be obtained in a first aspect of the invention by providing a method for controlling a plurality of wind turbines, the method comprising:

For each wind turbine in the plurality of wind turbines:
Providing a model which relates a plurality of wind turbine operation parameters to each other,
Measuring each of the wind turbine operation parameters in the model to obtain corresponding measured wind turbine operation parameter values, and
providing for one of the wind turbine operation parameters an estimated wind turbine operation parameter value, said estimated wind turbine operation parameter value being based on:
The model, and
the measured wind turbine operation parameter values corresponding to the plurality of wind turbine operation parameters except for the wind turbine operation parameter for which an estimated wind turbine operation parameter value is provided,
providing a reliability parameter value for the wind turbine based on a difference value, said difference value being a difference between:
The estimated wind turbine operation parameter value, and
the measured wind turbine operation parameter value corresponding to the wind turbine operation parameter for which the estimated wind turbine operation parameter value is provided, controlling the plurality of wind turbines based on the corresponding plurality of reliability parameter values.

The invention may be seen as particularly, but not exclusively, advantageous for obtaining a method which enables controlling a plurality of wind turbines based on their corresponding reliability parameter values. This may improve controlling the plurality of wind turbines, such the accuracy of controlling a plurality of wind turbines. For example, if the plurality of wind turbines are requested to produce less power, then the request for reduced power reduction can be sent primarily or exclusively to wind turbines with good reliability parameter values, which may in turn enable that an estimate of available power is more precise (e.g., compared to a situation where all wind turbines are requested to reduce power). By 'good reliability parameter values' may in this context be understood reliability parameter values corresponding to a small absolute or relative difference between the estimated wind turbine operation parameter value and the corresponding measured wind turbine operation parameter value.

For example, it may be possible to create a status signal which indicates whether the available power estimate produced by the wind turbine software can be trusted. Any wind turbines producing untrustworthy estimates (which can be revealed via poor reliability parameter values) can then be suppressed or removed from the power plant control (PPC) control loop resulting in more accurate power output from the plurality of wind turbines.

A wind turbine in a plurality of wind turbines can be understood as a wind turbine in a wind power plant. A wind power plant will normally have a power plant controller (PPC) communicatively coupled with the plurality of wind turbines for supervision and control of the wind turbines, e.g., forwarding set points to the wind turbines.

A plurality of wind turbines can also be understood as a subset of wind turbines in a wind power plant or a collection wind turbines from more than one wind power plant.

It may be seen as a basic insight of the present inventors that there might be a difference between said estimate and measured value, that said difference may be seen as related to reliability and that said reliability may be utilized for controlling the plurality of wind turbines.

Estimates of, e.g., available power may for example be based on knowledge of the aerodynamics of the wind turbine and is still susceptible to inaccuracies if the aerodynamic performance of a turbine is compromised due to e.g. dirt on the blades, ice, damage on blade leading edge or miscalibrated pitch angles.

It may be seen as an advantage of the present invention that poor or inaccurate estimates may be detected (and the degree of inaccuracy may even be quantified) for individual wind turbines and taken into account when controlling the plurality of wind turbines.

An advantage may thus be, that in a situation where one or more turbines produces inaccurate estimates of the available power; the PPC will be able to ensure that the wind farm produces the requested output power by use of the reliability parameter for each wind turbine.

Wind turbine is generally known in the art and may in general also be referred to as a wind turbine generator (WTG).

By 'a model' may be understood information which links certain values to certain other values, such as a mathematical model, such as an equation, or a table with corresponding values.

The model may be specific to each wind turbine. For example a model for one wind turbine within the plurality of wind turbines may be different with respect to another wind turbine within the plurality of wind turbines.

By 'wind turbine operation parameters' may be understood parameters relevant for operation of the wind turbine. The wind turbine parameters may be controllable, for example 'pitch angle' (for a wind turbine with controllable pitch angle), whereas others may be given (i.e., be uncontrollable) under certain circumstances, for example 'wind speed'.

By 'relates a plurality of wind turbine operation parameters to each other' may be understood that the model enables outputting an estimated wind turbine operation parameter value upon inputting remaining (in the model) wind turbine operation parameter values. These remaining wind turbine operation parameters are preferably measured or calculated values.

It may be understood that in some cases, it might not be necessary to input some wind turbine operation parameter values in a model, e.g., if they have negligible influence on the parameter to be estimated. These parameters are in that case not considered as belonging to said plurality of wind turbine operation parameters (which the model relates to each other), but rather considered to be a general part of the model, similarly to constants, etc.

In general 'measuring' may be construed to include one or more or all of physical measurements, simulation results, obtaining values from tables and guesses.

By 'estimated wind turbine operation parameter value' may be understood a value which is generated via the model and measurements of other measured wind turbine operation parameter values, such as wind turbine operation parameters corresponding to the plurality of wind turbine operation parameters except for the wind turbine operation parameter for which an estimated wind turbine operation parameter value is provided, i.e., the remaining (in the model) wind turbine operation parameters.

By 'reliability parameter' may be understood a parameter indicative of the reliability of the estimates of wind turbine operation parameters for a given wind turbine. For example, an estimated available power for a wind turbine with an associated good reliability parameter value can be trusted to a higher degree than an estimated available power for a wind turbine with an associated less good reliability parameter value.

It may be understood that the reliability parameter may be bad or become worse (for example due to an increased difference between estimated and measured parameter values) due to various reasons, e.g., if the model which relates a plurality of wind turbine operation parameters to each other is or becomes bad and/or if conditions change, e.g., one or more blades of a wind turbines deteriorate, become dirty or gets covered with ice.

In general, a 'parameter' may be representative of a data type, such as 'wind speed' or 'pitch angle', whereas '(parameter) value' may be the actual value, such as '10 m/s' or '10 degrees'. Values can be both measured and/or estimated.

By 'controlling a plurality of wind turbines' may be understood controlling said plurality by controlling individual wind turbines or groups of wind turbines within said plurality. For example, the total power production from the plurality of wind turbines may be controlled by controlling power production from one or more than one but not all or all of the wind turbines within said plurality.

In an embodiment, the method includes outputting a reliability parameter values for the plurality of wind turbines or a general reliability parameter value derived from the reliability parameter values for the plurality of wind turbines. An advantage of this may be that it enables $3^{rd}$ party access to the reliability parameter values for the plurality of wind turbines or the general reliability parameter value. The $3^{rd}$ party can then employ the reliability parameter values for the plurality of wind turbines or the general reliability parameter value, e.g., in order to assess the reliability of an estimate of the available power from the plurality of wind turbines.

In an embodiment the reliability parameter value is based on a product, between
- the difference value, and
- a sensitivity, such as sensitivity at the operating point, of produced power with respect to the wind turbine operation parameter for which the estimated wind turbine operation parameter value is provided.

An advantage of this may be, that a more precise indication regarding reliability of power estimates can be provided because the impact of the difference value on estimates of produced power is taken into account. For example a large difference value may be less detrimental to reliability of estimates of produced power if the sensitivity is low, i.e., if the produced power does not change much with respect to changes in the wind turbine operation parameter for which the estimated wind turbine operation parameter value is provided and vice versa. In an embodiment the reliability parameter value is proportional with or given by said product.

By 'operating point' (OP) may be understood an actual operating point of the wind turbine.

By 'sensitivity' may in general be understood the change in a parameter (e.g., produced power ($P_{prod}$)) with respect to another parameter, e.g., wind speed (V), i.e., sensitivity S of produced power with respect to wind speed may be given as $S=dP_{prod}/dV$, such as the sensitivity at the operating point $S=dP_{prod}/dV|_{OP}$.

The sensitivity may in general be provided, such as calculated, based on a model of the wind turbine when operated according to normal operating conditions (even if the wind turbine is actually operated according to curtailed operating conditions), where 'normal operating conditions' is understood to refer to operating conditions where the wind turbine power output is not curtailed. If a wind turbine in an example is operated according to curtailed operating conditions where it is constrained to a maximum output power, then sensitivity could be zero if it were based on a model of the wind turbine when operated according to the curtailed operating conditions because there may be no change in produced (curtailed) power with respect to other wind turbine operation parameters, e.g., wind speed where some operating points may yield $S=dP_{prod}/dV|_{OP}=0$ W/(m/s), because the curtailed output power remains constant (at the curtailed output power level) with respect to one or more other wind turbine operation parameters across at least a section of the parameter space (spanned by one or more other wind turbine operation parameters). If in another example a model corresponding to the normal operating conditions were used even if the wind turbine is actually operated according to curtailed operating conditions (for example the produced power $P_{prod}(V)$ as a function of wind speed according to normal (non-curtailed) operating conditions), then a non-zero sensitivity may be provided. An advantage of this may be that this non-zero sensitivity (based on the model corresponding to the normal operating conditions) may be better suited for estimating the reliability, e.g., for the purpose of determining reliability of an estimate of available power.

The reliability parameter may in general be normalized with respect to the rated power $P_{rated}$.

In an embodiment there is presented a method wherein controlling the plurality of wind turbines based on the corresponding plurality of reliability parameter values comprises curtailing the plurality of wind turbines, wherein an amount, such as an absolute or relative amount, of curtailment of each wind turbine in the plurality of wind turbines depends on the corresponding reliability parameter value.

An advantage of this may be that it enables controlling more precisely.

In a further embodiment there is presented a method wherein:

A wind turbine is used for curtailment of the plurality of wind turbines if the reliability parameter value for the wind turbine is above a predefined threshold, a wind turbine is not used for curtailment of the plurality of wind turbines if the reliability parameter value for the wind turbine is at or below a predefined threshold.

Wind turbine are curtailed or not depending on their reliability parameter value. This enables a simple control system.

The predefined threshold may be given as 0.1, or in alternative embodiments, it may be given as 0.01, 0.05, 0.25, 0.5, 0.75, where the reliability parameter is given as (see nomenclature elsewhere in this application):

$$R = DV_V * (dP_{prod}/dV)|_{OP}/P_{rated}$$

It may furthermore be possible to discard only some wind turbines from the curtailment, e.g., with a criteria given as: Discard 50% of turbines with reliability factor R>0.1.

It is in general noted, that wind turbines which are not used for curtailment might have their power reference set at either very lower power or at rated power.

For example when all wind turbines in the plurality of turbines have been assigned with a reliability parameter value, then controlling of the plurality of wind turbines may include:

determinining a curtailment level based on a demand from a grid operator, for example determine an overall requirement is 10% curtailment.

if all turbines are trustworthy (their reliability parameter values are equal to or better than a predefined threshold), then all turbines are curtailed, such as all turbines are curtailed 10%, if a group of turbines is not trustworthy (their reliability parameter values are worse than a predefined threshold), then let them produce what ever they can produce, and curtail the remaining (trustworthy) group of turbines to 10%+amount %, where "amount %" is selected so that the plurality of wind turbines is curtailed 10%.

In a further embodiment there is presented a method where curtailment of the plurality of wind turbines comprises:

Receiving a curtailment target for the plurality of wind turbines,

Curtailing each wind turbine depending on the corresponding reliability parameter value so that the curtailment target for the plurality of wind turbines is achieved.

For example, a model relates a degree of curtailment of each wind turbine with the reliability parameter value of the corresponding wind turbine. Said model may comprise a monotonously increasing or decreasing relation between degree of curtailment and reliability parameter.

In a further embodiment there is presented a method, such as a method where wind turbines are curtailed or not depending on their reliability parameter value, where curtailment of the plurality of wind turbines comprises:

Receiving a curtailment target for the plurality of wind turbines,

Curtailing the wind turbines which are used for curtailment so that the total curtailment corresponds to the curtailment target.

For example, with the nomenclature:

Relative curtailment target=T (e.g., T being 0.3 corresponding to 30% decrease in production), Curtailment of trustworthy wind turbines (such as wind turbines with a better reliability parameter value than the a predefined threshold)=T', Total production without curtailment=P1, Total production with curtailment=P2, Total production of trustworthy wind turbines (before respectively after curtailment)=PT1, respectively, PT2, Total production of non-trustworthy wind turbines (before, respectively, after curtailment)=PnT1 respectively PnT2, Then the curtailment T' of the trustworthy wind turbines may be given as: P2=P1*(1−T)=(PT1+PnT1)*(1−T)= PnT1+PT1*(1−T')<=>(PT1+PnT1)*(1−T)=PnT1+PT1*(1−T')<=>(PT1+PnT1)*(1−T)−PnT1=PT1*(1−T')<=>PT1*(1−T)+PnT1*(1−T)−PnT1=PT1*(1−T')<=>PT1*(1−T)+PnT1*(−T)=PT1*(1−T')<=>(1−T)+PnT1*(−T)/PT1=1−T'<=>T'=T(1+PnT1/PT1).

In an embodiment there is presented a method which further comprises for each wind turbine in the plurality of wind turbines:

providing a plurality of difference values with each difference value corresponding to a different point in time, Providing the reliability parameter value for the wind turbine based on the plurality of difference values.

An advantage of this may be, that the influence of one or a more, such as a few, non-precise reliability parameter values, e.g., due to sudden changes, can be reduced, such as smoothed out, if reliability parameter value is based on the plurality of difference values. The reliability parameter value according to this embodiment, may be described as a slowly updated parameter, because it does not change rapidly with rapid changes, but depends on previous historical reliability parameter values.

In an example, the reliability parameter value can be provided based on an average, such as a moving average, of a plurality of difference values (optionally an average of a plurality of products between difference values and the corresponding produced power sensitivity), such as a moving average of a plurality of reliability parameter values corresponding to individual time points.

In an example, the reliability parameter value can be provided based on a plurality of reliability parameter values corresponding to individual time points, but where fluctuations in reliability parameter values at individual time points are smoothed out, preferably by means of a low-pass filter, such as a first-order low-pass filter, such as a low-pass filter enabling exponential smoothing.

In an embodiment there is presented a method wherein the plurality of wind turbine operation parameters comprises one or more or all of:

Wind speed, such as wind speed (V), rotor speed, such as rotor speed (ω), pitch angle, such as pitch angle (θ), produced power, such as produced power ($P_{prod}$), losses, such as losses ($P_{loss}$), and a power coefficient, such as power coefficient ($C_p$), such as a power coefficient table.

In an embodiment there is presented a method wherein the wind turbine operation parameter for which an estimated wind turbine operation parameter value is estimated, is given by wind speed. A possible advantage of relying on wind speed is that it may be considered as a relatively direct approach because erroneous 'wind speed' measurements may relatively often be a relatively large factor in explaining a bad reliability parameter value, for example because the measured wind speed (measured at the back of a nacelle) corresponds poorly to the wind speed at the blades.

In another embodiment there is presented a method wherein the wind turbine operation parameter for which an estimated wind turbine operation parameter value is estimated, is given by pitch angle.

In an embodiment there is presented a method further comprising:
For each wind turbine within the plurality of wind turbines:
Determining an aerodynamic condition of blades of the wind turbine based on:
A change in the reliability parameter value during a time span.

An possible advantage of this may be that it enables detecting an optionally even quantifying an aerodynamic condition of the blades, by observing developments in the readily available reliability parameter.

In an embodiment there is presented a method further comprising:
Receiving meteorological information, such as temperature and/or humidity,
For each wind turbine within the plurality of wind turbines:
Determining an aerodynamic condition of blades of the wind turbine based on:
A change in the reliability parameter value during a time span, and
the meteorological information.

An possible advantage of this may be that it enables detecting an optionally even quantifying an aerodynamic condition of the blades, by observing developments in the readily available reliability parameter. A possible advantage of this may be that it enables taking the meteorological information. This may for example be of relevance when interpreting information relating to wet or ice covered blades.

The 'meteorological information' may be corresponding to meteorological information at one or more timepoints within the time span, such as at one or both ends of the time span.

In a further embodiment there is presented a method wherein the time span is less than 500 hours, such as less than 250 hours, such as less than 168 hours, such as less than 100 hours, such as less than 50 hours, such as less than 48 hours, such as less than 25 hours, such as less than 24 hours, such as less than 12 hours. For a relatively short time span, changes in the reliability parameter value may be due to over-icing. For example, correlating a rapid change, such as decrease, in the trustworthiness of a wind turbine (i.e., changes in the reliability parameter value) with meteorological measurements (low temperature, humidity) may be a good indicator of blades over-icing, thus enabling an ice detection system. A corresponding signal could be used to determine when to turn on de-icing systems.

In a further embodiment there is presented a method wherein the time span is more than 500 hours, such as more than 750 hours, such as more than 1000 hours, such as more than 1500 hours, such as more than 3000 hours, such as more than 5000 hours, such as more than 10000 hours. For a relatively long time span, changes in the reliability parameter value may be due to permanent changes in the wind turbine. For example, a steady decrease (e.g., over one or more months) in the trustworthiness of a wind turbine (i.e., changes in the reliability parameter value) may be an indication of a permanent aerodynamic degradation caused by e.g. dirty blades or worn leading edges. A corresponding signal could be used to schedule turbine service inspecting and/or cleaning of blades.

According to a second aspect there is presented a plurality of wind turbines arranged for being controlled according to a method according to the first aspect.

According to a third aspect there is presented a computer program product having instructions which, when executed cause a computing device or a computing system to perform a method according to the first aspect.

According to a fourth aspect there is presented a control system for controlling a plurality of wind turbines, said control system being arranged for controlling said plurality of wind turbines according to a method according to the first aspect.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The method for controlling a plurality of wind turbines based on reliability parameter values, corresponding plurality of wind turbines, computer program product and control system for controlling a plurality of wind turbines according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
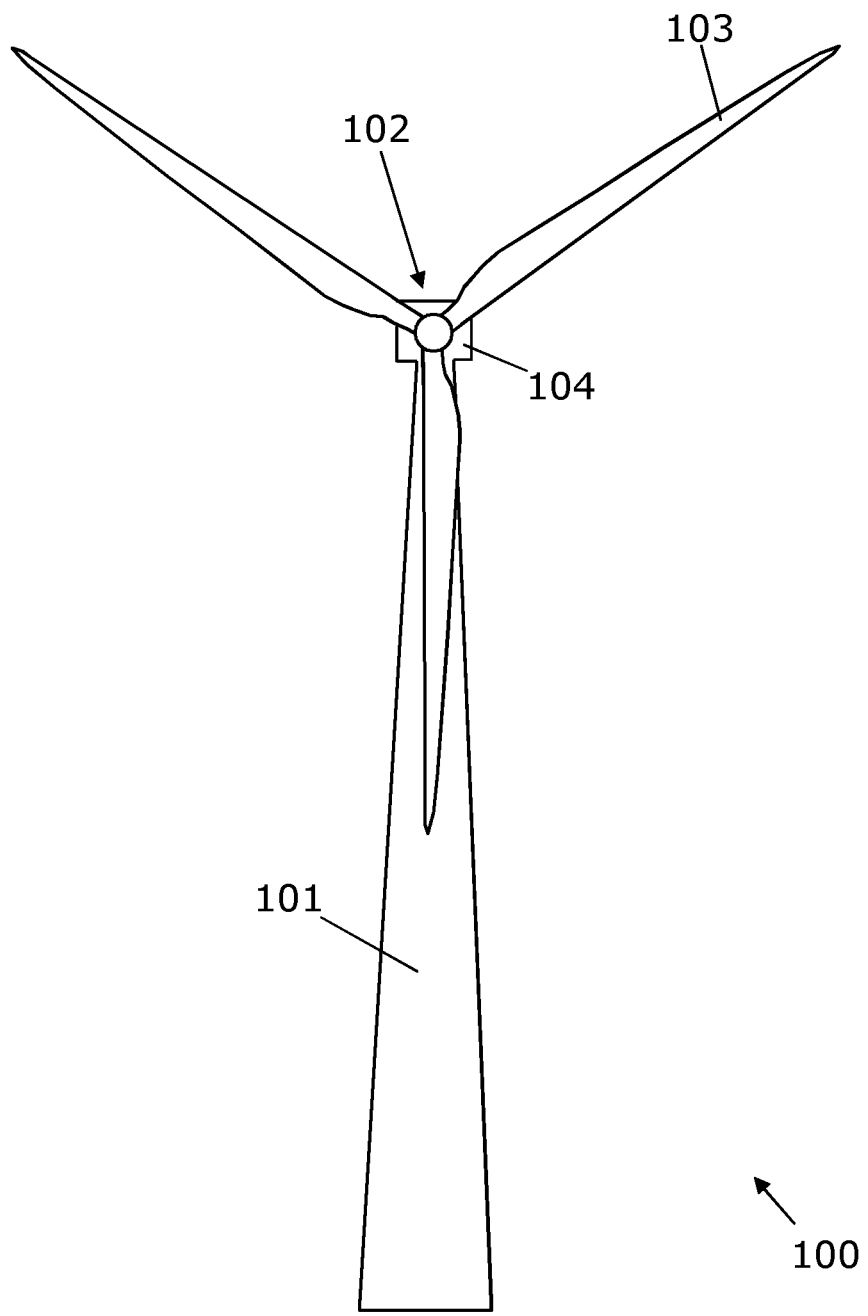
FIG. 1 shows a wind turbine.

FIG. 1 shows a wind turbine 100 (which may also be referred to as a wind turbine generator (WTG)) comprising a tower 101 and a rotor 102 with at least one rotor blade 103, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request.

The blades 103 can be pitched in order to alter the aerodynamic properties of the blades, e.g. in order to maximize uptake of the wind energy and to ensure that the rotor blades are not subjected to too large loads when strong winds are blowing. The blades are pitched by a pitch system with a pitch force system controlled by a pitch control system, where the pitch force system includes actuators for pitching the blades dependent on a pitch request from the pitch control system.

Figure 2:
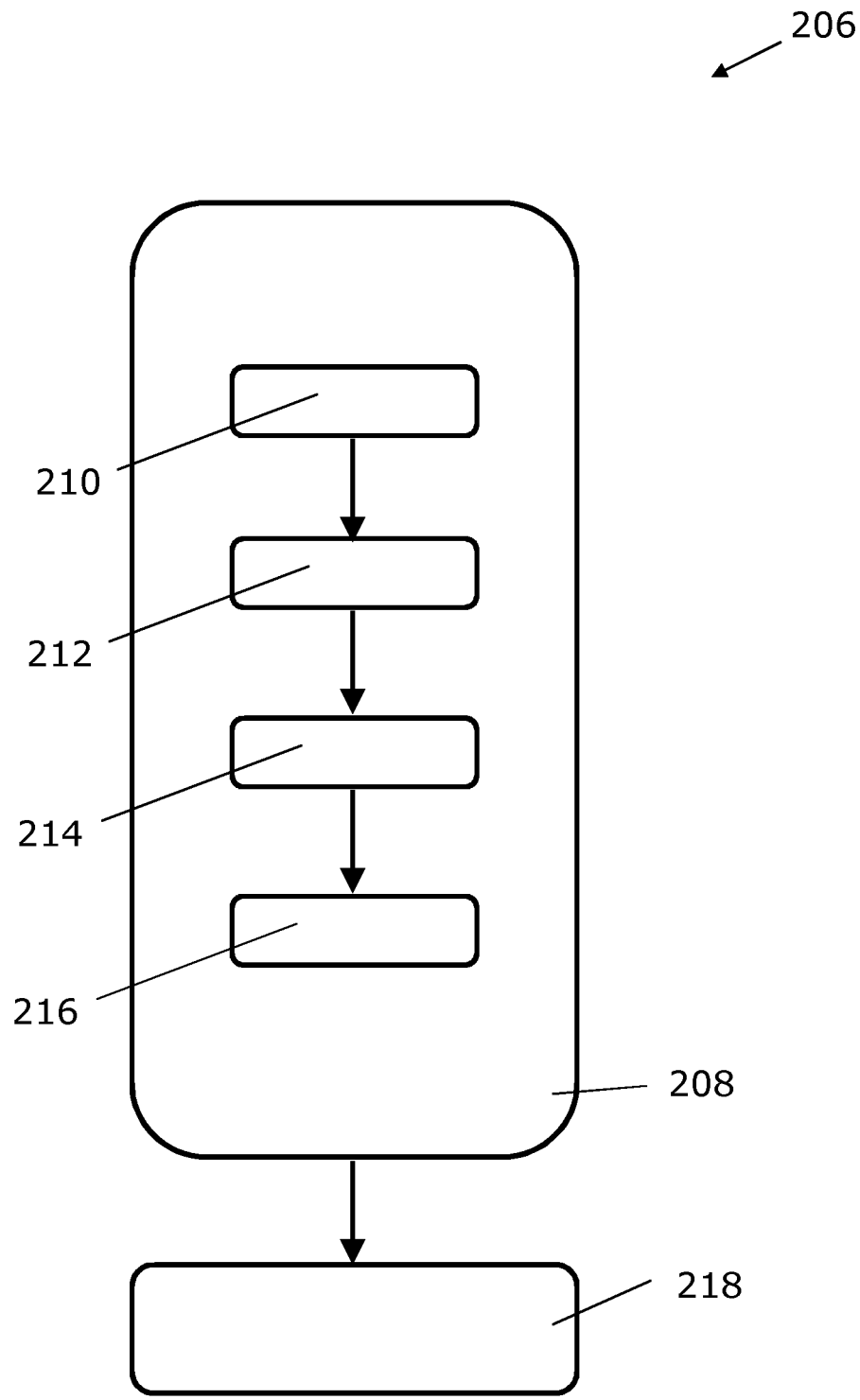
FIG. 2 is a flow chart illustrating a method for controlling a plurality of wind turbines 206.

FIG. 2 is a flow chart illustrating a method for controlling a plurality of wind turbines 206, the method comprising:
For each wind turbine 100 in the plurality of wind turbines (where the box 208 indicates a number of steps carried out for an individual wind turbine):
Providing a model 210 which relates a plurality of wind turbine operation parameters to each other,
Measuring each of the wind turbine operation parameters 212 in the model to obtain corresponding measured wind turbine operation parameter values, and
providing for one of the wind turbine operation parameters an estimated wind turbine operation parameter value 214, said estimated wind turbine operation parameter value being based on:
The model, and
the measured wind turbine operation parameter values corresponding to the plurality of wind turbine operation parameters except for the wind turbine operation parameter for which an estimated wind turbine operation parameter value is provided,
providing a reliability parameter value 216 for the wind turbine based on a difference value, said difference value being a difference between:
The estimated wind turbine operation parameter value, and
the measured wind turbine operation parameter value corresponding to the wind turbine operation parameter for which the estimated wind turbine operation parameter value is provided,
controlling 218 the plurality of wind turbines based on the corresponding plurality of reliability parameter values.

Figure 3:
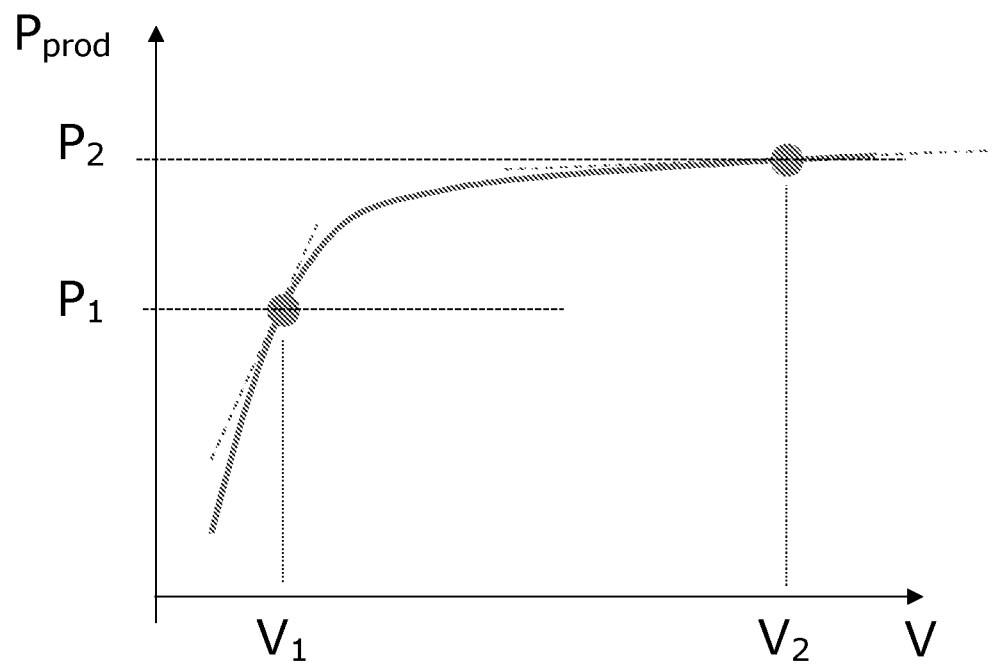
FIG. 3 is an illustration of an exemplary relation between produced power $P_{prod}$ and wind speed V.

FIG. 3 is an illustration of an exemplary relation between produced power $P_{prod}$ and wind speed V. Furthermore is illustrated that a given difference value may have different impacts on reliability of estimates of available power.

In a first example a wind turbine is curtailed to an output power $P_1$ and a difference value, which may be taken as a measure of an uncertainty with relation to a parameter, such as wind speed V, is provided. In a second example, the wind turbine is curtailed to an output power $P_2$ and the same difference value is provided.

The impact on an estimate of available power may, however, be different in the two examples, even though the difference values are identical.

At a relatively low wind speed $V_1$ there is a relatively high sensitivity $dP_{prod}/dV|_{OP=V\_1}$ as illustrated by the relatively large gradient represented by the slanted line), and this implies that the non-zero difference value implies a relatively large uncertainty in the available power. This is in contrast to the second example where the same difference value at a relatively high wind speed $V_2$ results in a relatively low uncertainty regarding an estimate of available power due to the relatively low sensitivity $dP_{prod}/dV|_{OP=V\_2}$ as illustrated by the relatively small gradient represented by the slanted line).

The figure furthermore illustrates the advantage of using a model of the wind turbine when operated according to normal operating conditions (even if the wind turbine is actually operated according to curtailed operating conditions, where 'normal operating conditions' is understood to refer to operating conditions where the wind turbine power output is not curtailed) for the calculation of sensitivity, because in case of curtailment the produced power may be constrained, for example at $P_1$ (represented by the horizontal line), which yields a sensitivity of zero (at least for a wind speed at or above $V_1$) in case a model describing the behaviour of the wind turbine during curtailment is employed. However, calculating sensitivity using a model of the wind turbine relating power and wind speed when operated according to normal operating conditions, the sensitivity becomes relatively large (as illustrated by the relatively large gradient represented by the slanted line), which may be more useful for calculating reliability of an estimate of available power.

Figure 4:
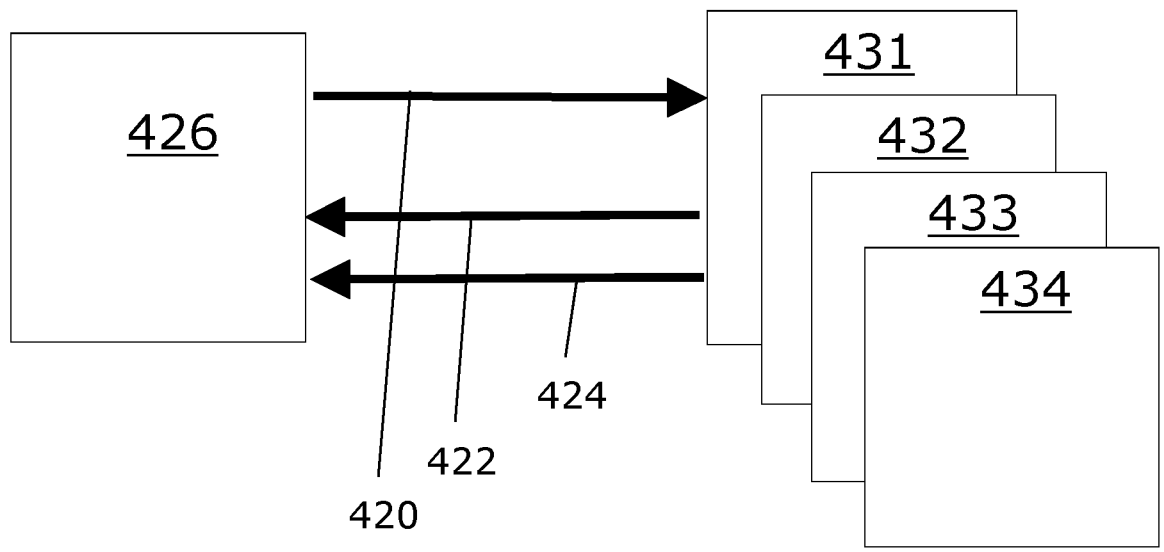
FIG. 4 is an illustration of controlling a plurality of wind turbines based on the corresponding plurality of reliability parameter values.

FIG. 4 is an illustration of controlling a plurality of wind turbines based on the corresponding plurality of reliability parameter values, where a power plant controller (PPC) 426 controls a plurality of wind turbines, which is here four turbines (first wind turbine 431, second wind turbine 432, third wind turbine 433, fourth wind turbine 434), and where the method comprises providing to the power plant controller for each wind turbine (only illustrated for the first wind turbine 431) an estimate of available power 422, a reliability parameter value 424, whereafter the power plant controller can control each wind turbine via a power reference 420. If the value of a reliability parameter for a given wind turbine indicates that it is not trustworthy, such as the reliability parameter being on the unreliable side of a predefined threshold, then other turbines (which are trustworthy) are used for controlling produced power of the plurality of wind turbines.

As an example of a calculation of an reliability parameter (R) value it is put forward that it could for example be given based on a difference value DV, where the wind turbine parameter for which an estimate is provided is the wind speed V, the difference value DV and the sensitivity $dP_{prod}/dV$ at the operating point (OP). In the speficic example, the reliability parameter is further normalized with respect to the rated power $P_{rated}$:

$$R = DV_V * (dP_{prod}/dV)|_{OP}/P_{rated}$$

where:
R is the reliability parameter,
$DV_V$ is the difference value based on wind speed (V), given as:

$$DV_V = V_{estimated}(P_{prod,\ measured},\ \theta_{measured},\ \omega_{measured}) - V_{measured}$$

$(dP_{prod}/dV)|_{OP}$ is the sensitivity with respect to wind speed (V) in the operating point (OP).
$P_{prod,\ measured}$ is the measured produced power.
$P_{rated}$ is the rated produced power.
$V_{estimated}(P_{prod,\ measured},\ \theta_{measured},\ \omega_{measured})$ is the wind speed estimated based on the measured wind turbine operation parameter values corresponding to the plurality of wind turbine operation parameters except for the wind turbine operation parameter for which an estimated wind turbine operation parameter value is provided, i.e., in the given example, the model relates wind speed V, produced power $P_{prod}$, pitch angle θ and rotor speed ω, and an estimate of the wind speed $V_{estimated}$ may thus be provided based on measured values of the remaining parameters, i.e., measured produced power $P_{prod,\ measured}$, measured pitch angel $\theta_{measured}$, and measured rotor speed $\omega_{measured}$. $V_{measured}$ is the measured wind speed.

As an example of a model relating a plurality of wind turbine operation parameters to each other, the following equation is presented:

$$P_{prod,\ estimated} = K * \rho * C_p * V_{measured}^3 - P_{loss}$$

Where:
K is a constant.
$V_{measured}$ is the measured wind speed.
$C_p$ is a function of wind speed (V), pitch angle ($\theta$) and rotor speed ($\omega$).
$\rho$(rho) is the air density (which could in general also be included in $V_{estimated}$).
$P_{loss}$ is losses.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a plurality of wind turbines, the method comprising:
   for each wind turbine in the plurality of wind turbines:
      providing a model which relates a plurality of wind turbine operation parameters to each other,
      measuring each of the wind turbine operation parameters to obtain corresponding measured wind turbine operation parameter values, and
      providing for one of the wind turbine operation parameters an estimated wind turbine operation parameter value, said estimated wind turbine operation parameter value being based on:
         the model, and
         the measured wind turbine operation parameter values corresponding to the plurality of wind turbine operation parameters except for the wind turbine operation parameter for which the estimated wind turbine operation parameter value is provided,
      providing a reliability parameter value for the wind turbine based on a product between a difference value and a sensitivity indicating a change of produced power with respect to the wind turbine operation parameter for which the estimated wind turbine operation parameter value is provided, said difference value being a difference between:
         the estimated wind turbine operation parameter value, and
         the measured wind turbine operation parameter value corresponding to the wind turbine operation parameter for which the estimated wind turbine operation parameter value is provided,
   controlling the plurality of wind turbines based on the corresponding plurality of reliability parameter values.

2. A method for controlling a plurality of wind turbines according to claim 1, wherein controlling the plurality of wind turbines based on the corresponding plurality of reliability parameter values comprises
   curtailing the plurality of wind turbines, wherein an amount of curtailment of each wind turbine in the plurality of wind turbines depends on the corresponding reliability parameter value.

3. A method for controlling a plurality of wind turbines according to claim 2, wherein:
   a wind turbine is used for curtailment of the plurality of wind turbines if the reliability parameter value for the wind turbine is above a predefined threshold, and
   a wind turbine is not used for curtailment of the plurality of wind turbines if the reliability parameter value for the wind turbine is at or below the predefined threshold.

4. A method for controlling a plurality of wind turbines according to claim 1, where curtailment of the plurality of wind turbines comprises:
   receiving a curtailment target for the plurality of wind turbines,
   curtailing each wind turbine depending on the corresponding reliability parameter value so that the curtailment target for the plurality of wind turbines is achieved.

5. A method for controlling a plurality of wind turbines according to claim 1, wherein the method further comprises for each wind turbine in the plurality of wind turbines:
   providing a plurality of difference values with each of the plurality of difference values corresponding to a different point in time, and
   providing the reliability parameter value for the wind turbine based on the plurality of difference values.

6. A method for controlling a plurality of wind turbines according to claim 1, wherein the plurality of wind turbine operation parameters comprises at least one of:
   wind speed,
   rotor speed,
   pitch angle,
   produced power,
   losses, and
   a power coefficient.

7. A method for controlling a plurality of wind turbines according to claim 1 wherein the wind turbine operation parameter for which an estimated wind turbine operation parameter value is estimated, is given by wind speed.

8. A method for controlling a plurality of wind turbines according to claim 1, the method further comprising:
   for each wind turbine within the plurality of wind turbines:
      determining an aerodynamic condition of blades of the wind turbine based on:
         a change in the reliability parameter value during a time span.

9. A method for controlling a plurality of wind turbines according to claim 1, the method further comprising:
   receiving meteorological information,
   for each wind turbine within the plurality of wind turbines:
      determining an aerodynamic condition of blades of the wind turbine based on:
         a change in the reliability parameter value during a time span, and
         the meteorological information.

10. A method for controlling a plurality of wind turbines according to claim 1, wherein the time span is less than 500 hours.

11. A method for controlling a plurality of wind turbines according to claim 1, wherein the time span is more than 500 hours.

12. A non-transitory computer program product having instructions which, when executed cause a computing device or a computing system to perform an operation, comprising:

for each wind turbine in a plurality of wind turbines:
provide a model which relates a plurality of wind turbine operation parameters to each other,
measuring each of the wind turbine operation parameters to obtain corresponding measured wind turbine operation parameter values, and
providing for one of the wind turbine operation parameters an estimated wind turbine operation parameter value, said estimated wind turbine operation parameter value being based on:
the model, and
the measured wind turbine operation parameter values corresponding to the plurality of wind turbine operation parameters except for the wind turbine operation parameter for which the estimated wind turbine operation parameter value is provided,
providing a reliability parameter value for the wind turbine based on a product between a difference value and a sensitivity indicating a change of produced power with respect to the wind turbine operation parameter for which the estimated wind turbine operation parameter value is provided, said difference value being a difference between:
the estimated wind turbine operation parameter value, and
the measured wind turbine operation parameter value corresponding to the wind turbine operation parameter for which the estimated wind turbine operation parameter value is provided,
controlling the plurality of wind turbines based on the corresponding plurality of reliability parameter values.

13. A control system for controlling a plurality of wind turbines, said control system being arranged for controlling said plurality of wind turbines according to an operation, comprising:

for each wind turbine in the plurality of wind turbines:
providing a model which relates a plurality of wind turbine operation parameters to each other,
measuring each of the wind turbine operation parameters in the model to obtain corresponding measured wind turbine operation parameter values, and
providing for one of the wind turbine operation parameters an estimated wind turbine operation parameter value, said estimated wind turbine operation parameter value being based on:
the model, and
the measured wind turbine operation parameter values corresponding to the plurality of wind turbine operation parameters except for the wind turbine operation parameter for which the estimated wind turbine operation parameter value is provided,
providing a reliability parameter value for the wind turbine based on a product between a difference value and a sensitivity indicating a change of produced power with respect to the wind turbine operation parameter for which the estimated wind turbine operation parameter value is provided, said difference value being a difference between:
the estimated wind turbine operation parameter value, and
the measured wind turbine operation parameter value corresponding to the wind turbine operation parameter for which the estimated wind turbine operation parameter value is provided,
controlling the plurality of wind turbines based on the corresponding plurality of reliability parameter values.

14. The non-transitory computer program product according to claim 12, wherein the operation further comprises for each wind turbine in the plurality of wind turbines:
providing a plurality of difference values with each of the plurality of difference values corresponding to a different point in time, and
providing the reliability parameter value for the wind turbine based on the plurality of difference values.

15. The control system according to claim 13, wherein the operation further comprises for each wind turbine in the plurality of wind turbines:
providing a plurality of difference values with each of the plurality of difference values corresponding to a different point in time, and
providing the reliability parameter value for the wind turbine based on the plurality of difference values.

* * * * *